United States Patent Office 3,565,928
Patented Feb. 23, 1971

3,565,928
PROCESS FOR PREPARING GAMMA-SUB-
STITUTED BETA-KETO ESTERS
John D. Hagarty, Racine, Wis., assignor to S. C. Johnson
& Son, Inc., Racine, Wis.
No Drawing. Filed Jan. 29, 1968, Ser. No. 701,053
Int. Cl. C07c 69/72; C11c 3/00
U.S. Cl. 260—410.9                                  6 Claims

ABSTRACT OF THE DISCLOSURE

A method of synthesizing gamma-substituted beta-keto esters, represented by the structural formula:

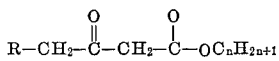

wherein R is an allylic hydrocarbon radical and $n$ is a whole number from 1 to 2. The corresponding unsubstituted beta-keto ester, represented as

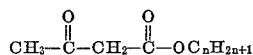

is converted to the corresponding dianion, represented as

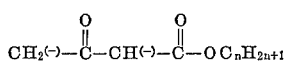

The gamma-allyl beta-keto ester is obtained by reacting this dianion with an appropriate organic compound, represented by the formula RX.

FIELD OF THE INVENTION

Broadly, the present invention relates to a process for synthesizing beta-keto esters having an allylic moiety on the gamma-carbon atom. In particular, the present invention is directed to the process of alkylating beta-keto esters at the terminal methyl group with an allylic compound. These esters are useful intermediates in the synthesis of pesticides such as pyrethroids.

The present invention is based on the preferential reaction between an allylic hydrocarbon halide and a gamma-carbon atom of a beta-keto ester to provide a one-step process for synthesizing gamma-substituted beta-keto esters. Generally, the synthesis of gamma-substituted beta-keto esters required three steps as shown by Schechter et al. in the "Journal of the American Chemical Society," 71, 3615 (1949), and in U.S. Patent 2,603,652.

Hauser et al. in the "Journal of the American Chemical Society," 80, 6360 (1958), discloses that beta-diketones such as acetylacetone can condense at the methylene group with certain reagents through the intermediate formation of the monosodio salts. Wolfe et al. in the "Journal of Organic Chemistry," 29, 3249 (1964), describe condensations at the methyl group of ethyl acetoacetate by means of potassium amide or sodium hydride.

It is an object of the present invention to provide a novel process for the preparation of gamma-substituted beta-keto esters.

It is a further object to provide a novel process for the preparation of gamma-substituted beta-keto esters by alkylation at the gamma-carbon atom of the appropriate beta-keto ester.

Still other objects and advantages of the invention will be apparent to those skilled in the art upon reference to the following detailed description and the examples.

SUMMARY OF THE INVENTION

Gamma-substituted beta-keto esters prepared by the novel process of the present invention can be represented by the structural formula:

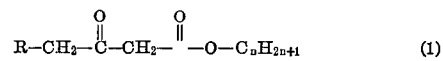 (1)

wherein R is an allylic hydrocarbon radical and $n$ is a whole number from 1 to 2. This structural formula shall be referred to hereinafter as Formula I. In a preferred embodiment of the invention, R is an allylic hydrocarbon having from 3 to 5 carbon atoms and at least one olefinic unsaturation, and $n$ is 2.

The process of the present invention comprises:

(A) Reacting an appropriate beta-keto ester with at least two equivalents of a base in an inert solvent, and
(B) Reacting the product of Step A with the allylic precursor of R as represented by the structural formula RX, wherein R is as defined above and X is a leaving group.

In Step A, the appropriate beta-keta ester, represented by the structural formula:

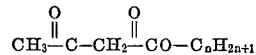

is reacted with at least two equivalents of a base in an appropriate solvent to produce the corresponding dianion which can be represented as:

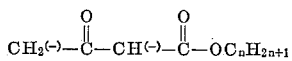

For the purpose of the present invention, the dianion is represented as the 2,4-dicarbanion although other resonance forms contribute to the structure of the molecule.

Suitable solvents useful in Step A include weakly acidic chemical substances which are liquid at the reaction temperature and which do not react with the base to an appreciable extent. Examples of suitable solvents include: ammonia, 1,2-dimethoxyethane, alkylamines, piperidine, and cyclohexylamine.

For the purposes of the present invention, a base suitable for dicarbanion formation is defined as a chemical substance which will accept a proton and has a dissociation constant, $pK_b$, of at least about 10. Such a base can be represented by the structural formula MZ, wherein M is an alkali metal such as sodium, potassium, and lithium and Z represents the anion of the solvents described above, such as $NH_2$,

or a hydride ion $H^-$. A discussion of dissociation constants is set forth in Chemical Indicators, O. Tomicek, Chapter II, Butterworth (1951).

It is desirable to use at least two molecular equivalents of MZ per mole of beta-keto ester to produce the corresponding dicarbanion of the beta-keto ester. For example, if one molecular equivalent of MZ such as sodamide is reacted with a beta-keto ester, a monocarbanion of the more acidic methylene carbon is obtained and carbon-carbon condensation will not occur at the terminal methyl carbon but rather at the more acidic methylene carbon atom.

In Step B, the dicarbanion of Step A is reacted with the alkyl precursor of R, represented by the structural formula RX, wherein R and X are as defined above. For the purposes of the present invention, the leaving group, X, is bound to R by means of a relatively weak bond. X can be derived from an organic or an inorganic substance and includes the following radicals: $Cl^-$, $Br^-$, $I^-$,

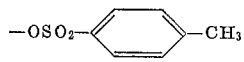

and

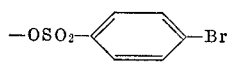

A discussion of effective leaving groups is set forth in Mechanism and Structure in Organic Chemistry, E. Gould, p. 201, Holt, Rinehart & Winston, New York, N.Y. (1962).

Specific examples of RX compounds include: allyl bromide, allyl chloride, 1-chloro-2-butene, 1-bromo-2-butene, 5-chloro-1-3-pentadiene, and 5-bromo-1,3-pentadiene. These compounds are typical of the homologous series of primary allyl halides which are suitable for alkylation of the gamma-carbon atom. Lower yields are obtained with secondary halides.

The gamma-substituted beta-keto ester monocarbanions produced in Step B can be neutralized with a proton donor having a $pK_a$ up to about 9. By this step, the monocarbanion can be converted to the gamma-substituted beta-keto ester. Suitable proton donors include: ammonium chloride, ammonium bromide, ammonium sulfate, and ammonium acetate or dilute acids. The mixture of neutralized gamma-substituted beta-keto esters in an inert solvent is a useful intermediate in the synthesis of various complex compounds, such as cyclopentenolones. Therefore, isolation of the neutralized ester from the reaction solvent is not necessary.

Alternatively, the monocarbanion could be further reacted with certain electrophiles such as pyruvaldehyde, acetaldehyde, acetone, benzaldehyde, allyl chloride, and n-propyl bromide to produce $\alpha,\gamma$ disubstituted beta-keto esters.

Detailed conditions for the process are described in Example 1 below.

EXAMPLE 1

Preparation of ethyl 3-oxo-6-heptenoate

A suspension of the base, sodamide, in the solvent, liquid ammonia, was prepared by the general procedure of Hauser and co-workers [Journal of Organic Chemistry, vol. 35, 158 (February 1960)]. Specifically, about 16 g. of freshly cut sodium was added to about 800 ml. of anhydrous liquid ammonia containing about 0.4 g. of ferric nitrate catalyst; stirred 1 hr.

The dicarbanion of ethyl acetoacetate was prepared according to the general procedure of Hauser and co-workers [Journal of the American Chemical Society, 87:14, 3186 (July 20, 1965)]. Specifically, about 49 g. of freshly distilled ethyl acetoacetate was added dropwise to the suspension of sodamide in liquid ammonia which was being stirred.

Approximately one hour after the acetoacetate had been added to the sodamide suspension, 38 g. of a freshly distilled RX compound, allyl chloride, was added rapidly. Stirring was continued for an hour. The resulting mixture was neutralized by the addition of 30 g. of the proton donor, ammonium chloride.

The ammonia solvent was replaced by ether. Water was added to the mixture of ether and ethyl 3-oxo-6-heptenoate. The water and ether layers separated, and the aqueous layer was acidified with hydrochloric acid and extracted twist with ether. The ether layers were combined, the ether was recoved, and the residue distilled to yield 16.3 g., 28% yield, of ethyl 3-oxo-6-heptenoate. This compound had the following properties: boiling point 140–141° C. (1.6 mm.), $n_D^{20}$ 1.4378; analysis calculated for $C_9H_{14}O_3$ (percent): C, 63.51; H, 8.23; found (percent); C, 64.60; H, 8.47. The "N.M.R." spectrum showed a triplet (3H) at 1.38 p.p.m., a complex multiplet (4H) at 2.5 p.p.m., a sharp singlet (3H) at 3.43 p.p.m., a quartet (2H) at 4.25 p.p.m., and a complex multiplet in the vinyl region (3H). The presence of the ethyl 3-oxo-6-heptenoate was further established by saponification and subsequent reaction with pyruvaldehyde according to the general procedure of Schechter et al., disclosed in U.S. 2,603,652. The corresponding cyclopentenolone was obtained and identified.

This process was repeated using different RX compounds. The results obtained are set forth in Table I.

TABLE I

| Example No. | Beta keto ester in grams* | Solvent in ml., liquid ammonia | Metal in grams (MZ) | RX in grams | Proton donor in grams | Gamma substituted beta keto ester in grams** | Percent yield | Boiling point, °C, mm. | $N_D^{20}$ | N.M.R.[1] spectrum | Analysis Calculated C | Calculated H | Found C | Found H |
|---|---|---|---|---|---|---|---|---|---|---|---|---|---|---|
| 2 | Ethyl acetoacetate, 44 | 800 | Sodium, 16 | cis, Trans-1-chloro-2-butene, 25 grams. | $NH_4Cl$ | Ethyl 3-oxo-6-octenoate, 28.4.[2] | 47 | 85-86.5, 0.7-0.9 | 1.4498 | Triplet at 1.30 p.p.m.[3] | | | | |
| 3 | Ethyl actoacetate, 15.6 | 250 | Sodium, 6.5 | 5-chloropiperylene, 12.2.[4] | do | Ethyl 3-oxo-6,8-nonadienoate, 7.6. | 33 | 116-114, 0.8 | 1.4810 | Triplet at 1.3 p.p.m.[5] | $C_{10}H_{16}O_3$ 65.22 | 8.76 | 65.63 | 8.86 |
| 4 | Ethyl acetoacetate, 22.8 | 250 | Sodium, 8.1 | Allyl chloride, 12.9. | $NH_4Cl$, 22. | Ethyl 3-oxo-6-heptenoate, 9.39. | 43 | 67-72, 1 | 1.4395 | | | | | |
| 5 | Ethyl acetoacetate, 49.4 | 400 | Sodium, 17.5 | Allyl chloride, 29.2. | $NH_4Cl$, 44. | Ethyl 3-oxo-6-heptenoate, 27.2. | 42 | 74-77, 1.1 | | | | | | |
| 6 | Ethyl acetoacetate, 36.4 | 500 | Sodium, 11.5 | Allyl chloride, 19.0. | $NH_4Cl$, 30. | Ethyl 3-oxo-6-heptenoate, 15.0. | 35 | 130-131, 1.5 | 1.4385 | | | | | |
| 7 | Ethyl acetoacetate, 32.5 | 800 | Potassium, 19.0 | Allyl chloride, 19.5. | do | Ethyl 3-oxo-6-heptenoate, 6.2. | 14 | 145-146, 2.3 | 1.4380 | | | | | |
| 8 | t-Butyl acetoacetate, 39.5 | 600 | Sodium, 11.5 | Allyl chloride, 19.1. | do | t-Butyl oxo-6-heptenoate, 16.9. | 34 | 55-60, 0.2 | 1.4420 | | | | | |
| 9 | Ethyl acetoacetate, 48 | 800 | Sodium, 16.0 | 1-chloro-2-butene, 22.5. | do | Ethyl 3-oxo-6-octenoate, 5.9. | 13 | 78-109, 6 | 1.4532 | | | | | |
| 10 | Ethyl acetoacetate, 39 | 800 | do | 1-chloro-2-butene, 54.0. | do | Ethyl 3-oxo-6-octenoate, 30. | 54 | 113-119, 8 | 1.4510 | | $C_{10}H_{18}O_3$ 67.32 | 8.17 | 67.63 | 8.29 |
| 11 | Ethyl acetoacetate, 44 | 800 | do | 1-chloro-2-butene, 25.0. | do | Ethyl 3-oxo-6-octenoate, 24.4. | 47 | 85-86.5, 0.7-0.9 | 1.4484 | | | | | |

NOTE:

$$*(CH_3\overset{O}{\overset{\|}{C}}-CH_2-\overset{O}{\overset{\|}{C}}-OC_nH_{2n+1})$$

$$**(R-CH_2-\overset{O}{\overset{\|}{C}}-CH_2-\overset{O}{\overset{\|}{C}}-OC_nH_{2n+1})$$

[1] Nuclear magnetic resonance.
[2] The purity of the material was high as established by vapor phase chromotography and thin layer chromotography; in addition, this compound was reacted with pyruvaldehyde to form the corresponding cyclopentenolone which was also identified.
[3] 3H quartet at 4.20 p.p.m., 2H singlet at 3.46 p.p.m., 2H multiplet at 3.5 p.p.m., 4H multiplet at 5.4 p.p.m., 2H.
[4] Prepared by reacting divinylcarbinol with concentrated hydrochloric acid and stored in an ethereal solution. The amount used is based on a 90% yield of 5-chloropiperylene.
[5] 3H quartet at 4.25 p.p.m., 2H singlet at 3.47 p.p.m., 2H multiplet at 2.6 p.p.m., 4H several peaks in vinyl region 5H.

Rather than form the dicarbanion described above from the corresponding beta-keto ester according to Step A, the dicarbanion can be obtained by reacting one molecular equivalent of MZ with the mono metallo beta-keto ester salt. For example, mono sodio ethyl acetoacetate, $$\overset{O}{\overset{\|}{CH_3C}}-\overset{Na}{\overset{|}{CH}}-\overset{O}{\overset{\|}{C}}-O-CH_2CH_3$$

can be reacted with one molecular equivalent of potassium amide in liquid ammonia.

The foregoing detailed description, including the specific examples, is for the purposes of illustration only and is not intended as being limiting to the spirit or scope of the appended claims.

It is claimed:

1. In the synthesis of gamma-substituted beta-keto esters represented by the structural formula $$R-CH_2-\overset{O}{\overset{\|}{C}}-CH_2-\overset{O}{\overset{\|}{C}}-OC_nH_{2n+1}$$

wherein R is an allylic hydrocarbon radical having 3 to 5 carbons and $n$ is a whole number from 1 to 2, the improvement comprising:

(a) Reacting the corresponding beta-keto ester with at least two molecular equivalents of a base in a solvent; and (b) Reacting the product of step (a) with the organic precursor of R, represented by the structural formula RX, wherein R is as defined above and X is an effective leaving group.

2. A process according to claim 1 wherein the product of step (b) is reacted with a proton donor having a $pK_a$ up to about 9.

3. A process according to claim 1 wherein the base has a $pK_b$ value of at least about 10 and is represented by the structural formula MZ wherein M is a metal selected from the group consisting of sodium, potassium, and lithium and Z is selected from the group consisting of the anion of said base and a hydride ion.

4. A process according to claim 1 wherein X is selected from the group consisting of $Cl^-$, $Br^-$, $I^-$, $$-OSO_2-\underset{}{\underset{}{\bigcirc}}-CH_3$$

and

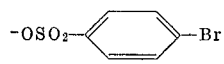

5. In the process for preparing gamma-substituted beta-keto esters, represented by the structural formula

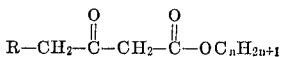

wherein R is an allylic hydrocarbon radical having 3 to 5 carbons and $n$ is a whole number from 1 to 2, the improvement comprising:
(a) Converting the corresponding beta-keto ester, represented by the structural formula:

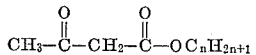

to the corresponding dianion by reacting said ester in liquid ammonia with at least about two molecular equivalents of a base, represented by the structural formula $MNH_2$, wherein M is a metal selected from the group consisting of sodium, potassium, and lithium;
(b) Reacting the reaction product of step (a) with a compound represented by the structural formula RX, wherein X is an effective leaving group and R is as defined above; and
(c) Neutralizing the reaction product from step (b) by the addition of a proton donor selected from the group consisting of ammonium chloride, ammonium bromide, ammonium sulfate, ammonium acetate, dilute hydrochloric acid, and dilute sulfuric acid.

6. In the synthesis of gamma-substituted beta-keto esters, represented by the structural formula

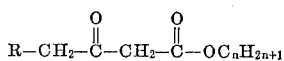

wherein R is an allylic hydrocarbon radical having 3 to 5 carbons and $n$ is a whole number from 1 to 2, the improvement comprising:
(a) Reacting the corresponding mono metallo beta-keto ester salt represented by the structural formula

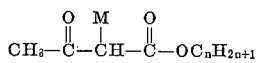

with at least about one molecular equivalent of a base in a solvent; and
(b) Reacting the product of step (a) with the organic precursor of R, represented by the structural formula RX, wherein R is as defined above and X is an effective leaving group.

References Cited

Hauser et al., J. Am. Chem. Soc. 80, 6360–3 (1958).
Fieser et al., "Organic Chemistry," 2nd ed., 1956, pp. 648–9.

LORRAINE A. WEINBERGER, Primary Examiner

R. S. WEISSBERG, Assistant Examiner

U.S. Cl. X.R.

260—483

UNITED STATES PATENT OFFICE
CERTIFICATE OF CORRECTION

Patent No. 3,565,928         Dated February 23, 1971

Inventor(s) John D. Hagarty

It is certified that error appears in the above-identified patent and that said Letters Patent are hereby corrected as shown below:

Column 1, line 20, the formula should appear as shown b

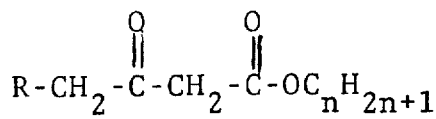

Column 2, line 35, the formula should appear as shown below:

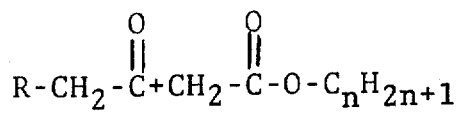

line 62, the formula should appear as shown below:

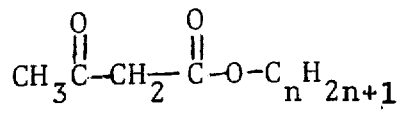

Column 3, lines 61 and 69, in both radicals, $OSO_2$         should read         $^-OSO_2$ Column 4, line 36, "Vol. 35" should read -- Vol. 25 --; line "49 g." should read -- 48 g. --; line 57, "twist" should rea -- twice --; line 58, "recoved" should read -- removed --; l 62, "$C_9H_{14}O_3$ (percent)" should read -- $C_9H_{14}O_3$: --; lines 62 63, "found (percent);" should read -- found: --. In Table I, Example No. 5, Col. "$N_D^{20}$" insert -- 1.4453. --.

FORM PO-1050 (10-69)

UNITED STATES PATENT OFFICE
CERTIFICATE OF CORRECTION

Patent No. 3,565,928      Dated February 23, 197

Inventor(s) John D. Hagarty      PAGE - 2

It is certified that error appears in the above-identified patent and that said Letters Patent are hereby corrected as shown below:

In Table I, Example 3, Col. "Analysis" "$C_{10}H_{16}O_3$" should read -- $C_{11}H_{16}O_3$ --. Claim 1, line 2, after "esters" insert a comma.

Signed and sealed this 16th day of May 1972.

(SEAL)
Attest:

EDWARD M. FLETCHER, JR.
Attesting Officer

ROBERT GOTTSCHALK
Commissioner of Patents